United States Patent Office 2,947,698

Patented Aug. 2, 1960

2,947,698

SILVER NIOBATE FERROELECTRIC MATERIALS

Frederic Holtzberg, Rockville Centre, N.Y., assignor to International Business Machines Corporation, New York, N.Y., a corporation of New York No Drawing. Filed Sept. 29, 1958, Ser. No. 763,788

3 Claims. (Cl. 252—62.9)

This invention relates to new ferroelectric ceramic materials in the silver niobate system and, more particularly, to the perovskite type ferroelectric compound having the formula $AgNbO_3$. Furthermore, it relates to methods of making the novel materials.

While a number of perovskite structure niobates are known in the art to possess, in their crystalline arrangement, ferroelectric characteristics, it has been the object of considerable research to provide other ferroelectric bodies which, by virtue of their piezoelectric characteristics may be utilized to advantage as electro-mechanical transducers. Such materials find wide use in digital computers, in piezoelectric relays, in telephone receivers and in phonograph pick-ups, such as are described generally in U.S. 2,598,707, issued to B. T. Matthias, and in ceramic condensers and related devices as well.

An object of the present invention is to provide a novel ferroelectric body suitable for use and application as a ceramic transducer.

Still another object is to provide convenient methods for preparing such materials.

Other objects of the invention will be pointed out in the following description and claims which disclose, by way of example, the principle of the invention and the best mode, which has been contemplated, of applying that principle.

It has been discovered that several compounds exist in the $Ag_2O.Nb_2O_5$ system. These include $Ag_2O.14Nb_2O_5$, $Ag_2O.4Nb_2O_5$, $Ag_2O.Nb_2O_5$ and $3Ag_2O.Nb_2O_5$. The most interesting from a utility standpoint is the 1:1 ratio compound which exhibits dielectric anomalies characteristic of a ferroelectric material. This invention is directed primarily to that 1:1 mole ratio compound, having the formula $Ag_2O.Nb_2O_5$, or simply $AgNbO_3$.

The silver niobate material of the present invention is preferably prepared by a high temperature solid state reaction involving niobium pentoxide and a silver salt. According to the practice of this invention, it is preferable to use a silver salt which reacts with niobium pentoxide to produce silver niobate at temperatures below which the salt itself decomposes. Silver sulfate is a preferable compound according to this criterion. Furthermore, it has the advantage of liberating a gaseous by-product during the reaction. Silver oxide which decomposes appreciably into free silver and oxygen at the reaction temperature is not nearly as suitable. The reaction is preferably carried out by a process in which an excess of the silver compound over the stoichiometric ratio required by the formula $AgNbO_3$ is used. Such an excess may be added initially or during a second heating step in which the reactants are sintered at elevated temperatures under controlled heating conditions. The reactants are preferably contained in a crucible lined with fused $Nb_2O_5$, since it has been found that contact with such materials as platinum at elevated temperatures causes decomposition of the silver compounds described. While various atmospheres may be used during the sintering steps, air has been found to be quite suitable.

*Example 1.*—Equi-molar mixtures of silver sulfate (18.8 grams) and niobium pentoxide (16.0 grams) were ball milled and fired in air at 695° for 48 hours, and cooled out of the furnace to room temperature to produce grayish-yellow material. 5 grams of this mixture and 6.3 grams of additional silver sulfate were placed in a niobium pentoxide lined platinum crucible and heated in air from room temperature to 1000° at a rate of 100° per hour, then further heated to 1100° over a period of 15 minutes, held at this temperature for 2 hours and cooled to room temperature at a rate of 50° per hour. The product was then washed with 1:1 $HNO_3$ to remove any excess silver which may have formed during the reaction. The product was pure yellow and analyzed for $AgNbO_3$.

*Example 2.*—55 mole percent $Ag_2SO_4$ (5.6 grams) and 45 mole percent $Nb_2O_5$ (3.9 grams) were heated at 750° in $O_2$ for 24 hours to produce a yellow colored product. This product was reheated at 1000° in $O_2$ for an additional 12 hours to produce a product which analyzed $AgNbO_3$.

The ceramic silver niobate thus prepared may be compressed and appropriately electroded to provide various types of electro-mechanical tranducer elements. To further assist those skilled in the art in fabricating such devices, the following physical characteristics of ferro-electric silver niobate are described below.

It should be mentioned at this point that the designation of the $AgNbO_3$ material of the present invention as being ferroelectric is based upon experimental measurements made on electroded ceramic wafers of $AgNbO_3$, in which fairly well-defined hysteresis loops in the temperature range of 170°–450° characteristic of a ferroelectric material are obtained. X-ray measurements, however, suggest the presence of extra lines in the distorted perovskite structure which are normally associated with an antiferroelectric substance. Thus, while we have referred to ceramic silver niobate as "ferroelectric," it is to be understood that this term includes the possibility of "antiferroelectric" behavior.

Lattice constants based upon a simple monoclinic cell shows $a=c=3.944$ A., $b=3.917$ A. and $\beta=90' 34''$. The monoclinic axes converge and $\beta$ approaches 90° as the temperature is increased. At approximately 230° C., $a$, $b$ and $c$ become equal but the cell is still monoclinic since $\beta$ is not 90°. At 292° C. the material transforms to a tetragonal structure and finally becomes cubic at about 530° C. Ceramic samples of silver niobate show dielectric constant versus temperature anomalies at about 60° and 292°, the latter being more distinct. The polarization-electric field experiments were performed at temperatures up to 453° with clean hysteresis loops observed. The nominal switching fields needed were of the order of 1.7 to 2.3 kv./cm.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the invention, therefore, to be limited only as indicated by the scope of the following claims.

What is claimed is:

1. A method of making a ferroelectric body comprising a ceramic of finely divided silver niobate having the formula $AgNbO_3$ which comprises forming a mixture of niobium pentoxide and an excess of silver sulfate over a niobium pentoxide: silver sulfate ratio of 1:1 and sintering the thus formed mixture at 700–1100° C.

2. A method of making a ferroelectric body comprising a ceramic of finely divided silver niobate which comprises forming a mixture of niobium pentoxide and silver sulfate in essentially an equimolar ratio, presintering the thus formed mixture at about 700° in air, adding an additional quantity of silver sulfate to the thus presintered product to bring the $Nb_2O_5$:$Ag_2SO_4$ ratio up to about 50 mole percent $Nb_2O_5$ to 75 mole percent $Ag_2SO_4$, increasing the temperature of said mixture slowly to 1000–1100°, heating at this temperature for bout 2 hours, cooling the thus sintered material slowly to room temperature, and washing the product obtained thereby with dilute $HNO_3$ to remove any metallic silver which may have formed during the sintering steps.

3. The method according to claim 2 wherein the reactants are contained in a platinum crucible lined with niobium pentoxide.

References Cited in the file of this patent

Bedford: "Columbates," J. Am. Chem. Soc., vol. 27, pp. 1216–1221 (1905).

Chemical Abstracts, vol. 30, col. 2129, paragraph 8.